Sept. 14, 1954     H. E. BOWERMAN     2,688,983
CLUTCH TUBE
Filed May 8, 1951                                            2 Sheets-Sheet 1
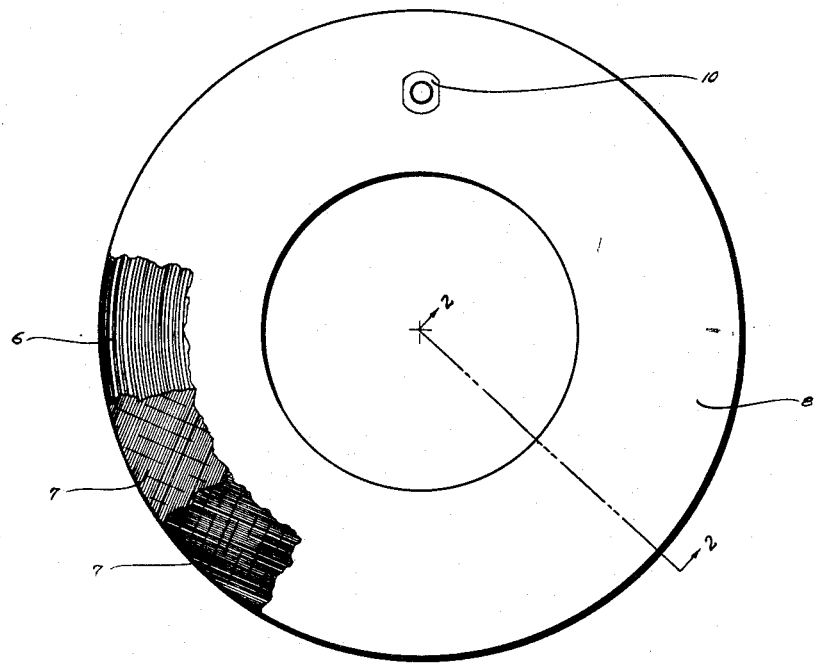
Fig. I.
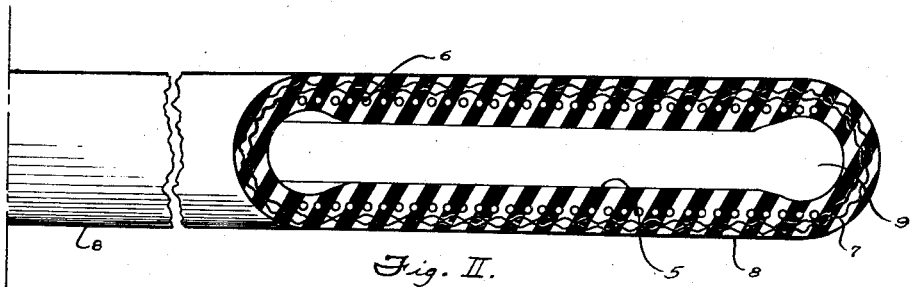
Fig. II.
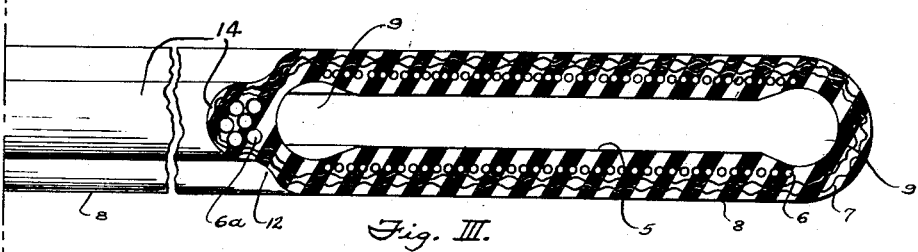
Fig. III.
INVENTOR.
HULIE E. BOWERMAN
BY *G.C.Waldrop*
ATTY.

Sept. 14, 1954     H. E. BOWERMAN     2,688,983
CLUTCH TUBE
Filed May 8, 1951     2 Sheets-Sheet 2
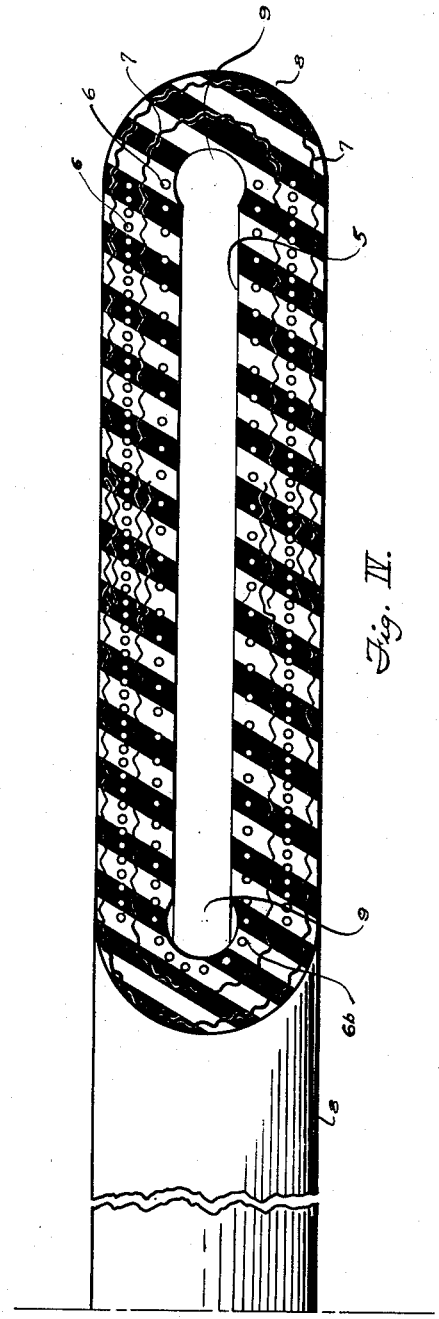
INVENTOR.
HULIE E. BOWERMAN
BY
ATTY.

Patented Sept. 14, 1954

2,688,983

UNITED STATES PATENT OFFICE 2,688,983

CLUTCH TUBE

Hulie E. Bowerman, Grand Prairie, Tex.

Application May 8, 1951, Serial No. 225,193

11 Claims. (Cl. 137—793)

This invention relates to tubes whereby clutch and brake mechanisms of the disk type are actuated. A fluid medium, such as air under pressure, is employed to expand or actuate a substantially toroidal tube as desired when it is operatively associated with conventional mechanisms of brakes and clutches, not shown herein since the latter are well known and understood in the art. Any suitable liquid medium such as a brake fluid or oil or water may also be employed to actuate the tube as convenience and the service conditions warrant.

More particularly the invention provides novel features which provide a tube structure capable of operating and functioning at speeds much higher than has been possible with other tubes, which permits brake and clutch mechanisms to be of proportionately smaller and more compact design for equivalent ratings or permits of higher ratings in the presently required space for such mechanisms. Highly favorable economies and efficiencies are thus attained.

Clutch tubes manufactured in accordance with my invention have performed consistently at speeds three to five times that of the maximum speeds attainable with conventional tubes. Novel features of my tube will readily be understood by those skilled in the art from the following description together with the accompanying drawings in which:

Figure I is an elevation, partly in section, of my disk-like tube.

Figure II is a section along line 2—2 of Figure I.

Figure III is a modifier form of Figure II.

Figure IV shows other modifications of Figures I, II, and III.

In the several views like references indicate similar elements, wherein 5 is an inner bladder of rubber, natural, synthetic, or the like, 6 is a spirally or circularly disposed reinforcing and 7 is another reinforcing such as a conventional tire fabric. 8 is a rubber covering for the reinforcings. 9 is the annular space in the completed tube for the fluid or liquid actuating medium which is received and discharged by way of spuds 10.

In manufacturing my tube I preferably proceed as follows:

A complete inner bladder 5 is formed and spud 10 inserted therein. I may then cure or partially cure this bladder, although it is not necessary to do so. Now I lay a cord 6 of fiber, cotton, rayon, nylon or the like, spirally about bladder 5, then place over the bladder 5 and cord 6 layers of fabric 7 as desired and encase the whole with an outer coating 8 and then cure the complete tube in a suitably heated mold by confining it in the latter and distorting it from within by a suitable medium such as air under pressure through spud 10.

The fabric 7 may have its main strands disposed crosswise of each other as shown in Figure I. This provides maximum strength to resist tube distortion pressures. The reinforcing 6 will resist centrifugal forces developed by the rotation of the tube.

Tubes without my reinforcing 6 will, at nominal speeds of rotation distort radially outwardly with respect to the axis of rotation of the tube or slump or expand under centrifugal stress. When this happens the clutch or brake will not function. By using my reinforcing 6 the centrifugal force is resisted or carried thereby to any desired speeds, since any number or size of these members 6 may be employed.

By employing reinforcings 6 and 7 of similar or complementary materials, utilization of the strengths of fabric 7 against centrifugal force may be realized while elements 6 pick up this resistance as speeds increase. It will be readily understood, however that elements 6 may provide the effective total resistance to the centrifugal forces.

I have shown in Figures I, II, and IV elements 6 embedded only in the sidewalls of my tubes, while in Figure III I have shown a selected number of circular or spiral reinforcings 6a disposed about the inner wall of the tube with the thickness of the tube decreased at and adjacent its inner wall as at 12 and about the reinforcings 6a. This permits the body of the tube to be flexed or depressed inwardly about annular space of cavity 9 adjacent the outer wall independently of reinforcings 6a.

As shown in Figure IV I may employ and dispose as desired any number of reinforcings 6, 6b and plies of fabric 7. Also I may dispose reinforcings 6 throughout the tube body as at 6b or in such other variations as service conditions may warrant.

It also is pointed out that I may employ reinforcings 6, 6a, and 6b of spirals or circular bands or rings of other materials than fiber, such as a metallic bead wire or the like of any shape or form desired. The reinforcings 6a are shown in Fig. III and are embedded in an annular bead 14 extending around the inner periphery of the tube. Further, any desired spacings of the reinforcings 6, 6a, and 6b may be employed to provide the desired contact and bonding of the rubber therewith. Varied spacings of these elements will be observed in the several views.

I employ rubbers of the flexing characteristics desired and resistive of the fluids and liquids with which they may be brought into contact, both inside and outside.

What I claim is:

1. An inflatable tube for rotating clutches, said tube comprising a flattened toroidal resilient bladder including substantially mutually parallel side wall portions joined by arcuate inner and outer wall portions; reinforcing fabrics embedded in said wall portions and extending completely therearound; and one or more layers of spaced annular metal reinforcements embedded in said respective side walls, each layer lying in a plane respectively normal to the axis of the toroid, said annular reinforcements preventing radial distortion of said side walls by the centrifugal forces of rotation.

2. In a tube as set forth in claim 1, the wall thickness of said inner and outer arcuate portions being reduced to facilitate flexing thereof, thereby permitting said parallel side walls to spread apart while remaining substantially parallel as the tube is inflated.

3. In a tube as set forth in claim 1, said fabrics and said annular reinforcements being arranged in alternate layers in said wall portions.

4. An inflatable tube for rotating clutches, said tube comprising a resilient bladder including substantially parallel side wall portions joined by arcuate inner and outer wall portions having an annular reinforcing bead around said inner arcuate portion; reinforcing fabrics embedded in said wall portions and extending completely around said wall portions and said bead; annular reinforcing cords embedded in said bead between said fabric and said inner arcuate portion; and one or more layers of annular cords embedded in said respective side walls, each layer lying in a plane respectively normal to the axis of the tube, said cords preventing radial distortion of said side walls and said inner wall by the centrifugal forces of rotation.

5. In a tube as set forth in claim 4, the wall thickness of said inner and outer arcuate portions being reduced to facilitate flexing thereof, thereby permitting said parallel side walls to spread apart while remaining substantially parallel as the tube is inflated.

6. In a tube as set forth in claim 4, said second mentioned cords extending around said inner arcuate portion and embedded therein.

7. In a tube as set forth in claim 4, said fabrics and said second mentioned cords being arranged in alternate layers in said wall portions.

8. An inflatable tube for rotating clutches, said tube comprising a resilient bladder including substantially parallel radially elongated side wall portions joined by relatively short arcuate inner and outer wall portions, said inner wall portion having an external annular reinforcing bead therearound; reinforcing means embedded in said wall portions and extending around the said bead and embedded in the outer periphery thereof; and relatively rigid annular metal wires embedded in said bead under said reinforcing means, said wires preventing radial outward distortion of said inner wall by the centrifugal forces of rotation.

9. In a tube as set forth in claim 8, the wall thickness of said inner and outer arcuate portions being reduced to facilitate flexing thereof, thereby permitting said parallel side walls to spread apart while remaining substantially parallel as the tube is inflated.

10. An inflatable tube for rotating clutches, said tube comprising a flattened toroidal resilient bladder including substantially mutually parallel side wall portions joined by arcuate inner and outer wall portions; reinforcing fabrics embedded in said wall portions and extending completely therearound; and one or more layers of spaced substantially annularly disposed reinforcing cords embedded in said respective side wall portions, each layer lying in a plane normal to the axis of the toroidal bladder, said cords opposing radial distortion of said side wall portions by the centrifugal forces of rotation.

11. In a tube as set forth in claim 10, said reinforcing cords extending around at least one of said arcuate wall portions.

References Cited in the file of this patent

UNITED STATES PATENTS

| Number | Name | Date |
|---|---|---|
| 531,822 | Woodward | Jan. 1, 1895 |
| 1,211,035 | Archer | Jan. 2, 1917 |
| 2,268,249 | Goodrich | Dec. 30, 1941 |
| 2,387,486 | Zellos | Oct. 23, 1945 |